June 10, 1969  J. J. DENARO  3,449,035
STROBOSCOPE MIRROR DEVICE
Filed June 1, 1965
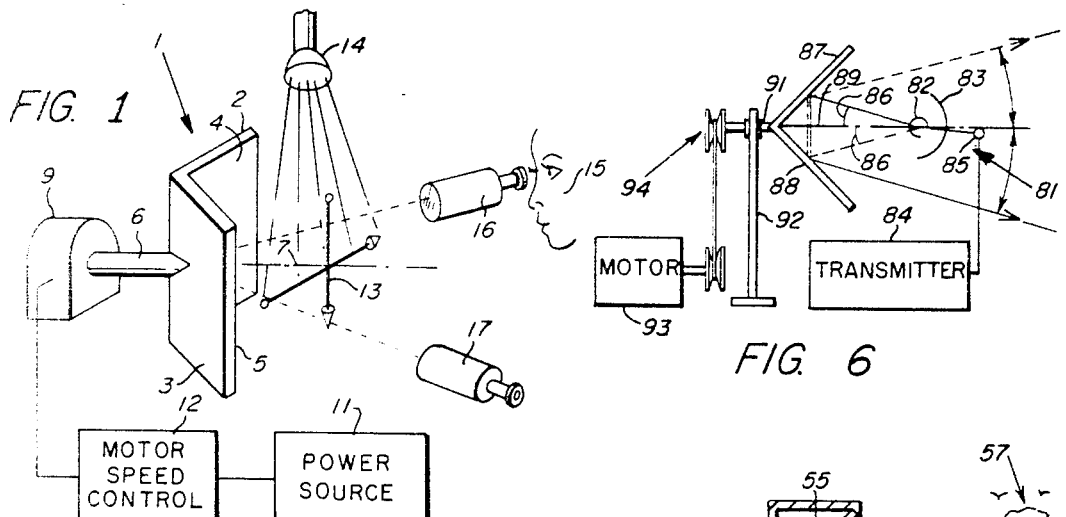
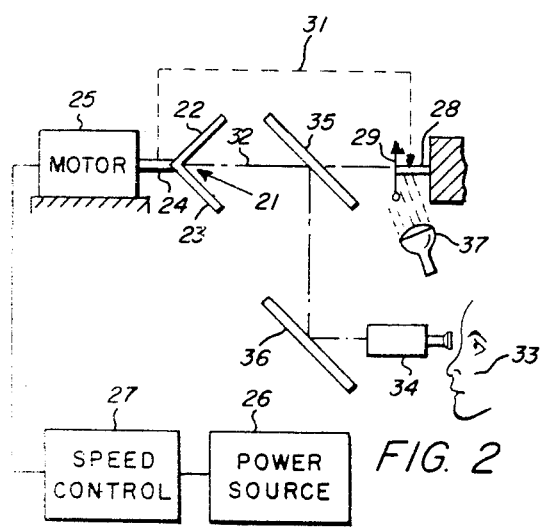
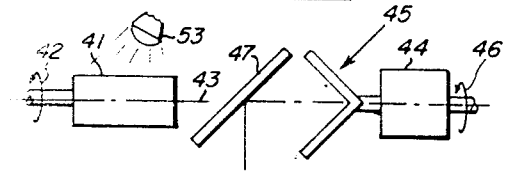
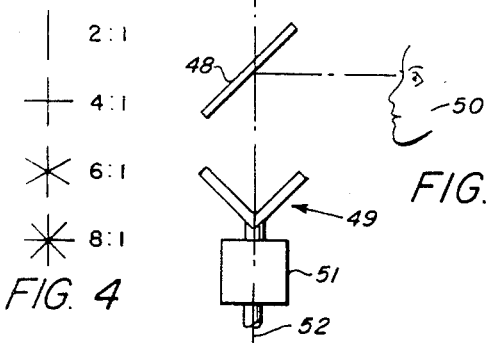
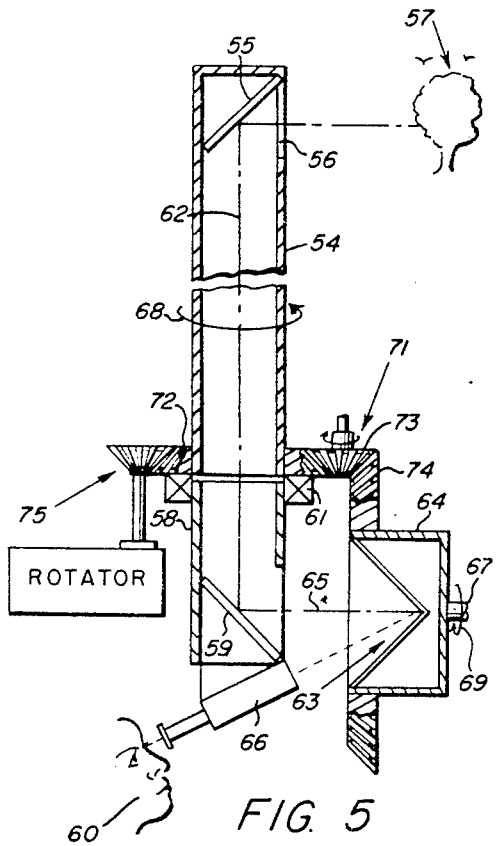
INVENTOR
JAMES J. DENARO
BY Robert T. Dunn
ATTORNEY

United States Patent Office 3,449,035
Patented June 10, 1969

3,449,035
STROBOSCOPE MIRROR DEVICE
James J. Denaro, 542 Bedford St.,
Concord, Mass. 07142
Filed June 1, 1965, Ser. No. 460,446
Int. Cl. G01p *3/40;* G02b *23/08*
U.S. Cl. 350—7                                        5 Claims

ABSTRACT OF THE DISCLOSURE

A rotating image of an object or scene produced by rotation of the object or rotation of an optical device directed at the scene, is directed to a pair of mirrors disposed in orthogonal planes and fastened together on a line common to both. The mirrors are rotated on an axis transverse to the line and bisecting the angle defined by the mirrors so that the image viewed in them does not appear to rotate at the same rate as the rotating image directed to them.

---

This invention relates to mirror devices and more particularly to a combination of mirrors that can be driven in rotation producing a stationary image of a rotating object.

Heretofore, optical systems have been employed for viewing a scene whereby the scene is swept by the optical system, and in doing so an image is produced for the viewer which rotates due to the sweeping action. In such systems it is desirable for the viewer to observe an image which is not rotating. This problem has been remedied in periscope systems where it is required that the objective portion of the periscope system rotate about a vertical axis to sweep the horizon around the compass rose. In periscope systems, the objective end directs downward an image which rotates as the periscope sweeps the horizon. The rotating image is directed through a dove prism which refracts light then reflects light and refracts it again so that the image is reversed about one of two orthogonal axes. From the dove prism, the image is directed to a second image reversal system which reverses the image about the second of the two orthogonal axes and finally the image is directed to a third reversing system which reverses the image again about the first of the two orthogonal axes and directs the image to the eyepiece of the periscope. In operation, as the periscope sweeps the horizon at an angular rate $\omega$, the dove prism is driven in rotation at an angular rate $\omega/2$. Meanwhile the second and third image reversing systems in the periscope remain stationary with respect to the rotating dove prism. The viewer at the eyepiece views the horizon which appears to him just as the horizon would appear if he were viewing it with the naked eye around the compass rose. The rotating image issuing from the periscope eyepiece does not rotate because the rotation is compensated for by the rotation of the dove prism. The technique employed in the periscope to compensate for image rotation requires three image reversing systems one of which is the dove prism. It is one object of the present invention to provide an optical system in which such rotation is compensated for by a single unit of reflectors driven in rotation and which may be viewed directly to observe a true stationary image.

It is another object of the present invention to provide the relatively simple optical system by which to observe an image of a remote rotating body with means for driving the optical system in rotation so that the rotational rate of the image relative to an observer is different from the rotational rate of the object relative to the observer.

Heretofore, stroboscope type devices have been employed to measure rotational speed of a body. A typical stroboscope includes a pulsing light source which provides pulses of light at a controlled rate. These pulses of light illuminate the rotating body which is preferably shrouded by darkness except for the light from the pulsating source. When the rate of the light pulses is equal to the rotational speed of the body, the body appears to the observer to be stationary. However, due to the intermittent nature of the stroboscope light and the quality of the light, detail inspection of the rotating body by the observer is most difficult and, at best, the observer can merely ascertain that the pulse rate is the same as the rotational speed of the body and thereby determine the rotational speed of the body. It is most difficult for the observer to inspect in detail various parts, components or occurrences in the body during rotation by employing such a stroboscope device. Ordinarily it is not possible for the observer to employ a stroboscope to observe a centrifuge in action so as to inspect the processes of separation, precipitation or other phenomenon which occurs during centrifuge. Inspection would be difficult because of the intermittent nature of the stroboscope light and the quality of the light. Furthermore, illumination is limited to light that can presently be obtained within the state of the art with stroboscope devices. This does not include all of the visible spectrum, infrared, microwave and other bands of radiation. It is therefore an object of the present invention to provide a system employing radiation reflectors whereby a rotating body which is illuminated by a steady source of just about any sort of radiation at any intensity will appear to a radiation detector or an observer to be stationary or rotating at a speed other than its actual speed.

It is another object of the present invention to provide an optical system for attachment to a rotating body and in which a second rotating body may be viewed producing an image the rotational rate of which is indicative of the synchronism between the two rotating bodies.

It is another object of the invention to provide means for reflecting a stationary beam whereby the reflected beam sweeps an area of space in a repeated manner.

In accordance with a principle feature of the present invention, a pair of mirrors are disposed in orthogonal planes with the edge of one mirror abutting the other and the mirrors are rotated on an axis which lies in a plane orthogonal to the planes of both mirrors and which bisects the planes of the mirrors. In operation the mirrors direct an image of a rotating object to viewing instruments or to an observer providing to the instruments or the observer an image of the rotating object which is stationary or rotating at a different speed than the speed of rotation of the object as determined by the speed of the rotation of the mirrors about the axis.

The above feature of the invention is employed in a number of embodiments for different effects and purposes. For example, when the speed of rotation of the mirrors about the axis is one-half the speed of rotation of the object, the image of the object appears to the observer to be stationary and not rotating. Thus, the object can be illuminated with just about any sort or intensity of radiation including microwave, infrared, visible ultra-violet or other radiation which behaves similar to light insofar as the relationships with respect to angles of incidence and reflection are concerned. Detail features of the rotating object can be inspected by the observer just as though the object were not rotating and were stationary relative to the observer.

In another embodiment, the mirrors are fixed to a body rotating at a known speed and the image of a body rotating at an unknown speed is observed in the mirrors. When the image of the body rotating at the unknown speed appears stationary to the observer, it can be concluded that the rotational speed of the known body is one-half the rotational speed of the unknown body and rotations are in the same direction. If the directions of rotation are not the same, no stationary image can be obtained. Furthermore, when the speeds of the two bodies do not bear the two to one relationship, the rotational speed of the image will be the differential and this differential speed can be measured by a similar combination of mirrors mounted on another body rotating at a known speed. Thus, a vernier for measuring rotational speed of the unknown body is provided.

The principal features of the invention mentioned above are employed in a variety of different ways to accomplish entirely different effects. For example, in another embodiment they are employed to cause a radar maser or laser beam to sweep a repeated pattern.

Other features and objects of the present invention are apparent from the following specific descriptions taken in conjunction with the figures in which:

FIGURE 1 illustrates an arrangement including rotating mirrors for observing a rotating body under illumination;

FIGURE 2 illustrates a similar arrangement in which the rotating mirrors and rotating body are mechanically linked;

FIGURE 3 illustrates an arrangement including rotating mirrors for comparing the rotational speeds of two bodies;

FIGURE 4 illustrates various patterns observed in the rotating mirrors at given ratios of rotational speed;

FIGURE 5 illustrates a simple periscope device employing mirrors rotating in synchronism with the periscope objective mirror; and FIGURE 6 illustrates a simple arrangement of rotating mirrors for reflecting a substantially stationary beam of radiation so that the reflected beam spatially sweeps in a repeated pattern.

Turning first to FIGURE 1 there is shown a pair 1 of mirrors 2 and 3 which preferably reflect at their front faces 4 and 5, respectively. The mirrors are fixed together at their edges so that the faces 4 and 5 lie in orthogonal planes. The pair of mirrors are mounted on an axle 6 which lies in a plane transverse to the planes in which the faces lie and on an axis 7 which bisects the angle formed by the planes in which the faces lie. A right angle prism with two totally reflecting faces and mounted on an equivalent axis could be substituted for the pair of mirrors.

The axle and mirrors are driven in rotation about the axis 7 by a motor 9 energized from a power source 11 at a rate determined by motor speed control 12. In operation, a rotating body 13 illuminated by any desired sort of radiation at any intensity from a source 14 is preferably oriented so that the axis on which the body rotates is coincident with axis 7. If the body 13 is rotating at a rate $\omega$ in a clockwise direction as viewed directly by the observer at 15 and the mirrors are rotated in the same direction at a speed $\omega/2$, then the image of body 13 as viewed in the mirrors by the observer will be stationary and the observer can inspect the effects of rotation on the body under the selected illumination. Optical devices such as 16 and 17 are provided for observing the body 13 under these conditions.

Another embodiment for accomplishing the same purpose is illustrated in FIGURE 2. This includes a pair 21 of orthogonally disposed mirrors 22 and 23 mounted on an axle 24 driven in rotation by a motor 25 which is energized by source and control 26 and 27 as shown. The motor also drives another axle 28 upon which is mounted the body 29 which is to be observed when rotating. For this purpose a mechanical linkage 31 is provided between the two axles.

The axles 24 and 28 are preferably aligned on the same axis 32 and the linkage 31 is such that the body 29 rotates at twice the rate of rotation of the mirrors. In this embodiment the image of the body 29 is viewed by an observer at 33 through a suitable optical device 34. The image from the rotating mirrors is directed to the observer via a half silvered mirror 35 and a plane mirror 36 disposed as shown. The half silvered mirror 35 is disposed between the pair of mirrors 21 and the rotating body and reflects an image of the body from the pair of mirrors to the plane mirror 36 which reflects the image to the observer. Thus, the image from the rotating mirrors 21 is reflected twice and then presented to the observer. Since the number of reflections is an even number, the image presented to the observer is in the same orientation as the image from the rotating mirrors.

One or more sources of illumination such as 37 are provided for iluminating the rotating body. The amount of illumination required in the system in FIGURE 2 is normally greater than for the system in FIGURE 1 because the half silvered mirror transmits about half and reflects about half of the light directed to it.

The system in FIGURE 2 is suitable for observing the effects of centrifugal force on bodies and fluids in just about any desired radiation. For example, fluids can be inspected by the observer under infrared illumination or a transparent model of a structural member can be illuminated to reveal stress and strain patterns in the model caused by the centrifugal force. These are only a few of many possible uses of the device.

The system in FIGURE 3 is employed to measure the rotational direction and speed of a body or to bring the speeds of different bodies into a predetermined speed synchronism. One body 41 rotates at an unknown speed in the direction of the arrow 42 about the axis 43. A second body 44 disposed on the same axis is equipped with a pair of mirrors 45 which rotate with the body in the direction of the arrow 46. Both of these bodies may be rotating at unknown speeds or one, such as 44, may be rotating at a known speed. In either case the image of body 41 in the mirrors 45 will rotate at the differential between the speed of body 41 ($\omega_1$) and twice the speed of body 44 ($2\omega_2$). When $\omega_1=2\omega_2$, the image will be stationary.

The image or body 41 is reflected by half silvered mirror 47 through a second half silvered mirror 48 to a second pair of rotating mirrors 49 attached to a third rotating body 51 so that the mirrors 49 rotates on an axis 52 which is preferably orthogonal to axis 43 and defines a plane with axis 43 which is transverse to the planes of the half silvered mirrors 47 and 48.

In operation the body 41 is illuminated by a source 53 and is observed at 50 after reflection from both pairs of rotating mirrors 45 and 49 and both half silvered mirrors 47 and 48. Thus, the image appears to the observer when it is stationary to be oriented just as the stationary object (body 41) if it were viewed directly by the observer. This is because the light from the object experiences an even number of reflections.

The system in FIGURE 3 may be operated in different ways. For example, if $\omega_1 \neq 2\omega_2$ then the rotational speed ($\omega_3$) of mirrors 49 can be varied until the image viewed by the observer is stationary. When this occurs then it can be concluded that $\omega_1-2\omega_2=2\omega_3$. When the differential speed $\omega_1-2\omega_2$ is but a very small percent of $\omega_1$, then $\omega_3$ serves as a vernier in conjunction with $\omega_2$ for measuring the unknown rotational speed $\omega_1$. In other words a course measure of the unknown $\omega_1$ is revealed by $\omega_2$ and a fine measure by $\omega_3$. Obviously the system illustrated could be expanded to include additional pairs of rotated mirrors to achieve third and fourth order vernier measurements of $\omega_1$.

A simple way to determine the relationship between speeds of the two bodies 41 and 44 is to mark body 41 with a line crossing the axis 43. When the speed ratio of $\omega_1:\omega_2$ is 2:1 the line will appear as shown in FIGURE 4. When the ratio is 4:1 the line will appear as two lines crossing to make a figure having two axes of symmetry coincident with the lines. At a ratio of 6:1, three lines appear making a figure having three axes of symmetry coincident with the lines and so forth. Thus, the specific speed ratios 2:1, 4:1, 6:1, 8:1 and so forth can be identified by the observer viewing directly into mirror 47.

A simple periscope device is shown in FIGURE 5 for use by a stationary observer at 60 to view the horizon around the compass rose. The objective end of the periscope includes a rotatable tube 54 with a plane mirror 55 at one end opposite a window 56 through which the scene 57 is viewed. At the other end of the tube rotatably connected thereto is the image end of the device including a housing 58 open at one end to the tube and with a plane mirror 59 at the other end in optical alignment with the mirror 55. A suitable bearing 61 attached to the tube and the housing permits the tube to be rotated relative to the housing about the optical axis 62.

A pair of orthogonally disposed front reflecting mirrors 63 in a housing 64 is mounted for rotation about an axis 65 which is preferably transverse to axis 62 and a telescope 66 is mounted just below the housing for observing the image reflected from the pair of mirrors.

The axel 67 on which the pair of mirrors 63 rotates is mounted by suitable means (not shown) to the housing 58 so that the mirrors 63 can rotate about axis 65 which is stationary relative to the housing 58. The mirror housing 64 also connect by a mechanical drive to the tube 54 so that the mirrors 63 rotate at exactly one half the speed that the tube rotates and so that when tube rotation is in the direction of arrow 68, the mirrors rotate in the direction of arrow 69. For this purpose the mechanical linkage 71 is provided.

The mechanical linkage 71 includes, for example, three bevel gears 72, 73 and 74. Gear 72 is rigidly attached to the tube 54, gear 74 is attached to the mirror housing 64 and gear 73 is an idler to provide the proper relative directions of rotation. In operation, any of the three gears may be driven by the observer who observes the scene swept by the objective end of the periscope through the telescope. For example, the gears may be driven by a coupling 75 to bevel gear 72.

The various embodiments described above all serve in one manner or another to render stationary an image of a rotating body and, thus, they cancel rotation. The embodiment in FIGURE 6, in a sense, adds rotation to a substantially stationary image. The purpose of the system in FIGURE 6 is to provide a spatially sweeping pattern of radiation emanating from a stationary body. This includes a source of radiation 81 which may be, for example, a microwave horn 82 and dish 83 powered by microwave energy from a source 84. The dish is pivoted at 85 so that the elevation angle 86 of the lobe or beam of radiation emanating from the dish can be varied. This beam is reflected by a pair of microwave reflectors 87 and 88 orthogonally disposed edge to edge and rotatable about an axis 89. For this purpose the reflectors are mounted on axel 91 which is supported by a stand 92. The reflectors are driven in rotation by a motor 93 via a pulley system 94.

In operation, the beam from the source 81 is reflected so that it sweeps in a circular fashion at twice the rate of rotation of the reflectors. The solid angle subtended by the sweeping beam is twice the elevation angle 86 and so the solid angle of the sweep may be changed by changing the elevation angle. The system can be used in a number of different ways to provide different types of spatial sweep patterns. For example, when the elevation angle is varied cyclically (by means not shown) at a rate substantially greater than the rate of rotation of the reflectors about the axis 89, the reflected beam sweeps a $\rho,\theta$ type pattern in space. The $\rho,\theta$ pattern is well known to those familiar with radar sweep systems and is sometimes referred to as a polar coordinate sweep.

On the other hand when the elevation angle is varied cyclically at a rate substantially less than the rotation rate of the reflectors, the beam sweeps space in a spiral pattern. Various other patterns can also be obtained as the two rates approach the same value.

This completes descriptions of a few embodiments of the present invention including a pair of radiation reflectors disposed orthogonally and preferably abutting each other and rotated on an axis so that the image of objects viewed in the mirrors appears to be rotating at a speed other than the actual rotating speed of the object, more particularly so that rotating objects appear stationary or stationary objects appear to be rotating. The various embodiments illustrated are examples of the invention and do not limit the spirit and scope of the invention as set forth in the accompanying claims.

I claim:
1. A periscope device comprising,
elongated means defining a light path, objective optical means at one end of said light path for directing light from a scene to said light path,
a pair of mirrors disposed in orthogonal planes and fastened together at a line common to both,
means at the other end of said light path for directing light from said light path to said mirrors,
drive means connected to said pair of mirrors and said optical objective means for rotating said mirrors on an axis substantially perpendicular to said line and bisecting the acute angle defined by said mirrors,
and for rotating said objective means so that the scene is scanned by said objective means, and
observing means for viewing the image of said scene reflected from said pair of mirrors, the rotational rate of said pair of mirrors on said axis being one half the rotational scene scan rate of said optical objective means,
whereby said scan scene may be viewed in said observing means.
2. A periscope device as in claim 1 and in which,
said elongated means is disposed vertically,
said objective optical means is a mirror at said one end of said light path for reflecting the view of the horizon vertically along said light path with said elongated means,
said means at the other end of said light path is a second mirror for directing said horizontal scene to said pair of mirrors substantially along said axis of rotation,
said observing means and said second mirror are substantially fixed relative to each other, and
a single drive means rotates said elongated means and said pair of mirrors about substantially orthogonal axes, said second mirror and said observing means being stationary relative to said orthogonal axes,
whereby said horizon scene may be scanned about the compass rose and observed through said observing means by an observer remaining relatively stationary.
3. A periscope device as in claim 2 and in which,
said optical objective mirror at one end of said light path is contained in said elongated means which is a cylinder, and
said second mirror at the other end of said light path is contained in a housing, and
said cylinder and housing are oriented end to end and rotatably connected so that the one can rotate while the other is fixed.
4. A device for reflecting an image of a rotating subject comprising,
first and second pairs of mirrors, the mirrors in each pair disposed in orthogonal planes and fastened together on a line common to both, and means connected to each pair of mirrors for rotating each pair on an axis substantially perpendicular to the common line and bisecting the angle defined by the mirrors in each pair,
said subject and each of said pairs of mirrors being disposed substantially on an optical path which coin- cides with the rotation axis of each of said pairs of mirrors, and which coincides substantially with the axis of rotation of the subject, observing means, and means for directing an image of the rotating subject along the optical path so that it reflects from the first pair of mirrors and the reflection from the first pair of mirrors is directed to the second pair of mirrors and the reflection from the second pair of mirrors is directed to the observing means, whereby the relative rotational speeds of the subject and the first and second pairs of mirrors may be determined.

5. A device as in claim 4 and in which, said first pair of mirrors and said subject rotate on a common axis, the axis on which said second pair of mirrors rotates is transverse to said common axis, said directing means includes a first partially transparent, partially reflective mirror between said subject and said first pair of mirrors, and a second partially transparent, partially reflective mirror between said first pair of mirrors and said second pair of mirrors for directing the image therefrom to said observing means.

References Cited

UNITED STATES PATENTS

| | | | |
|---|---|---|---|
| 815,657 | 3/1906 | Swasey | 350—23 |
| 959,013 | 5/1910 | Howell | 350—7 |
| 2,280,492 | 4/1942 | Kenngott. | |
| 2,454,959 | 11/1948 | Barnes. | |
| 3,244,885 | 4/1966 | McHenry | 350—7 XR |

OTHER REFERENCES

Parkes; "IBM Technical Disclosure Bulletin," "Optical Amplifier," vol. 4, No. 4, September 1961.

DAVID SCHONBERG, *Primary Examiner.*

PAUL R. GILLIAM, *Assistant Examiner.*

U.S. Cl. X.R.

178—7.6; 250—235